US008554798B2

(12) United States Patent
Vandanapu et al.

(10) Patent No.: US 8,554,798 B2
(45) Date of Patent: Oct. 8, 2013

(54) ASYNCHRONOUS STATE ENGINE WITH PLUG-INS FOR FLEXIBLE APPLICATION DEVELOPMENT

(75) Inventors: Pulleswararao Vandanapu, Fremont, CA (US); Fannie Ho, Fremont, CA (US); Vikrant Jain, New Delhi (IN)

(73) Assignee: Oracle International Corporation, Redwood Shores, CA (US)

( * ) Notice: Subject to any disclaimer, the term of this patent is extended or adjusted under 35 U.S.C. 154(b) by 494 days.

(21) Appl. No.: 12/582,467

(22) Filed: Oct. 20, 2009

(65) Prior Publication Data
US 2011/0093505 A1 Apr. 21, 2011

(51) Int. Cl.
*G06F 17/30* (2006.01)
(52) U.S. Cl.
USPC .......................................................... 707/793
(58) Field of Classification Search
None
See application file for complete search history.

(56) References Cited

U.S. PATENT DOCUMENTS 5,754,857 A * 5/1998 Gadol ............................ 709/203
7,424,717 B2 * 9/2008 Blevins ......................... 719/318
2002/0032692 A1 * 3/2002 Suzuki et al. ................. 707/200
2009/0171818 A1 * 7/2009 Penning et al. ................. 705/30
2009/0228368 A1 * 9/2009 Brown ............................ 705/26
2010/0138255 A1 * 6/2010 Podhajsky et al. ................ 705/7

OTHER PUBLICATIONS

Jennings, N.R. et al., "Autonomous Agents for Business Process Management", Applied Artificial Intelligence, 14: 145-189 (2000), pp. 145-189.*

* cited by examiner

*Primary Examiner* — Fred I Ehichioya
*Assistant Examiner* — Richard Bowen
(74) *Attorney, Agent, or Firm* — Kilpatrick Townsend & Stockton LLP

(57) ABSTRACT

Various embodiments of the present disclosure provide for an asynchronous state engine incorporated within a host application program. The state engine may operate based on a state transition table that may be updated independently of the host application. The state transition table may instruct the asynchronous state engine as to actions that should be performed prior to changing states. Such actions may include interacting with external applications. The state transition table may also instruct the host application to reside in a hold state until responses from external applications are received. Furthermore, the state transition table may instruct the host application as to follow up actions that should be performed when a state is entered. By allowing an external application to plug-in criteria for state changes within the host application, development of the host application may maintain a significant level of flexibility.

19 Claims, 8 Drawing Sheets

| Current State | Next State | Action | Hold | Follow Up |
|---|---|---|---|---|
| None | New Employee | | | |
| New Employee | Resource Provision Complete | 1. Request E-mail Acct.<br>2. Request Accounting Acct.<br>3. Request Benefit Acct. | 1. E-Mail Response<br>2. Accounting Response | |
| Resource Provision Complete | Access Provision Complete | 1. Set Accounting Access Level | 1. Access Level Response | 1. Update HR w/ access level |
| Access Provision Complete | New Employee Created | 1. Request Building Access | 1. Building Access Response ← 502 | |
| New Employee Created | Done | | | 1. Update Benefits w/ e-mail address |

ASYNCHRONOUS STATE ENGINE WITH PLUG-INS FOR FLEXIBLE APPLICATION DEVELOPMENT

BACKGROUND

The use of computers to model business processes has become ubiquitous. Software applications that manage every aspect of a business are readily available. Applications that manage human resources, access to information technology resources, benefits, accounting, payroll, resource management, and almost any other aspect of a business are in use today and form an important part of the operation of almost any business.

Many typical business applications represent business processes through the use of objects. For example, an employee may expend funds on behalf of the organization and submit an expense report to receive reimbursement. In some cases, the expense report may be a physical form that the employee fills out, while in other cases the employee may fill out the expense report electronically. One common method of receiving an employee expense report may be to provide a web page that the employee may direct his web browser to in order to enter information about the expense. The information about the expense may then be entered into an accounts payable system, either directly from an electronic source, such as the web page, or manually through a data entry process. An accounts payable system may model this expense as an object. As is known in the art of object oriented programming, an object may be an electronic representation of a collection of related data that may be manipulated as a single entity. For example, the expense report object may contain an amount of the expense, the employee who paid the expense, the entity that received the payment, and any other information that would be necessary to process the expense. Encapsulating all of the data that makes up an expense into a single object may allow the accounts payable system to simplify processing of the expense because individual data elements that make up the expense no longer need to be correlated with each other. All data related to a given expense may be treated as a single entity.

Typically, the expense object may have a state, and as the expense object is processed, the state may change. For example, when the employee begins the process of entering an expense for reimbursement, an expense object may be created, thus changing, or creating, a state of the expense object from "DOES NOT EXIST" to "CREATED." After the employee has entered any necessary information to process the expense, such as reasons for the expense, amount, etc., the employee may submit the expense to the accounts payable system. At this point, the accounts payable system may change the state of the object from "CREATED" to "SUBMITTED."

As part of the process of paying an expense, an approval for the expense may be required. For example, the employee's supervisor may need to review the expense and determine if it is appropriate for the expense to be paid. The accounts payable system may send a notification to the supervisor, perhaps through an e-mail message, indicating that an expense requiring approval needs to be processed. The supervisor may then review the expense, and if appropriate, approve the expense. Notification of the approval may then be returned to the accounts payable system. The accounts payable system may then move the expense object from a "SUBMITTED" state to an "APPROVED" state. Alternatively, in the case where the expense is not approved, the expense objet may be moved to a "REJECTED" state, and the employee may be notified his expense was rejected.

In the normal flow however, the expense will be approved. At this point, the accounts payable system may cause a payment to be issued to the employee. After the payment is issued, the accounts payable system may move the expense object from an "APPROVED" state to a "PAID" state. The movement between states of a business object within an isolated application, such as an accounts payable application, is a relatively straightforward process. In some implementations, a business application may make use of a state engine to keep track of the current state of the business object and actions to be performed within that state prior to moving to a next state. In the present example, the normal flow of the expense object would be to start in the "CREATED" state. Once the employee submits the expense, the state engine may move the expense object to the "SUBMITTED" state. In that state, the state engine may be programmed to request an approval from a supervisor. The state engine may keep the expense object in the "SUBMITTED" state until the approval is received, at which point the expense object is moved to the "APPROVED" state. In the "APPROVED" state, the state engine may request a payment, and once issued the expense object may be moved to the "PAID" state.

As mentioned above, use of a state engine in an isolated business application is relatively straightforward. However, business applications operating in isolation in today's business environment are increasingly rare. Typically there are many different applications involved in running a modern business, and each application may require information from other applications. For example, the expense discussed above may have been paid in relation to fulfilling an obligation related to a business contract. In such cases, a contracts application may need to be informed to indicate that the obligation has been met. In addition, the expense may have been related to completion of a project, such that a project management application may need to be informed.

To add further complexity, situations may arise wherein an external application may need to prevent a state change within the instant application. For example, an expense object may be in the "APPROVED" state. As far as the accounts payable system is concerned, the expense should be paid because it has been approved, and the expense object moved to the "PAID" state. However, an external application, such as a contracts application, may have a reason that the expense should not be paid. Perhaps the contract related to the expense is in default, and as such, no payments should be made. Thus the contracts application requires a mechanism to prevent the accounts payable application from moving the expense object to the "PAID" state until an approval is received from the contracts application.

Attempts at providing a solution to the above described scenario are less than ideal. In some solutions, a seemingly endless string of "if-then" conditions may be embedded in an application's state engine. For example, if the above described scenario, the transition from the "APPROVED" state to the "PAID" state may require determining if a contracts application is installed, and if so, notifying the contracts application, and waiting for a response. Similarly, this condition may be repeated for any number of other applications. Some external applications may just need to be notified of the impending state change, while others, such as the described contracts application, may need to be able to actually prevent the state change from occurring.

As should be clear, such solutions are not ideal for a number of reasons. One reason is that every time a new external application is installed, the host application must be modified if the external application wishes to interface to with the host application. Another reason the solution is not ideal is from a standpoint of software maintainability for the host application. A seemingly endless series of checks to determine which external applications are installed, which external applications may need to be notified of state changes, and which external applications may need the ability to prevent a state change, leads to increasingly complex software code within the application that is very difficult to maintain. Furthermore, all of the additional complexity required for interfacing with the external applications does nothing to improve the operation of the host application.

Embodiments of the present disclosure attempt to solve problems such as those mentioned above, as well as others that would be readily known to one of skill in the art.

BRIEF SUMMARY

Systems and methods in accordance with various embodiments of the present disclosure may overcome the problems associated with interfacing a host application with external applications, wherein the external applications may need to affect the operation of the host application.

In one embodiment, a computer program product embedded in a computer readable medium is provided. The computer program product may implement a computer application with an asynchronous state engine that comprises computer code for creating an object, the object representative of a transaction processed by the asynchronous state engine and having a state. The computer program product may further comprise computer code for performing a state transition of the object from an initial state to a next state, the state transition being specified in a state transitions table. The state transitions table may include tasks to be performed by the asynchronous state engine when transitioning to the next state. The computer program product may also comprise computer code for performing the tasks specified in the state transitions table.

In addition to other computer products that may be used in accordance with these and other embodiments, there also are a number of systems, methods, and other such aspects for implementing, practicing, performing, or otherwise utilizing aspects of the various embodiments.

A further understanding of the nature and the advantages of the inventions disclosed herein may be realized by reference to the remaining portions of the specification and the attached drawings.

BRIEF DESCRIPTION OF THE DRAWINGS

Various embodiments will be described with reference to the drawings, in which:

FIG. 5 depicts an exemplary state transition table after the addition of a new external application;

DETAILED DESCRIPTION

Various embodiments of the present disclosure provide for an asynchronous state engine incorporated within a host application program. The asynchronous state engine may operate based on a state transition table that may be updated independently of the host application. The state transition table may instruct the asynchronous state engine as to actions that should be performed prior to changing states. Such actions may include interacting with external applications. The state transition table may also instruct the host application to reside in a hold state until responses from external applications are received. Furthermore, the state transition table may instruct the host application as to follow up actions that should be performed when a state is entered. By allowing an external application to plug-in criteria for state changes within the host application, development of the host application may maintain a significant level of flexibility. The addition of a new external application that must interface with the host application no longer requires modification of the host application. The external application may simply update the state transition table to indicate when the external application should be contacted, should the host application wait for a response from the external application, and are there any follow up actions required by the external application once a state is entered.

Exemplary System

Figure 1:
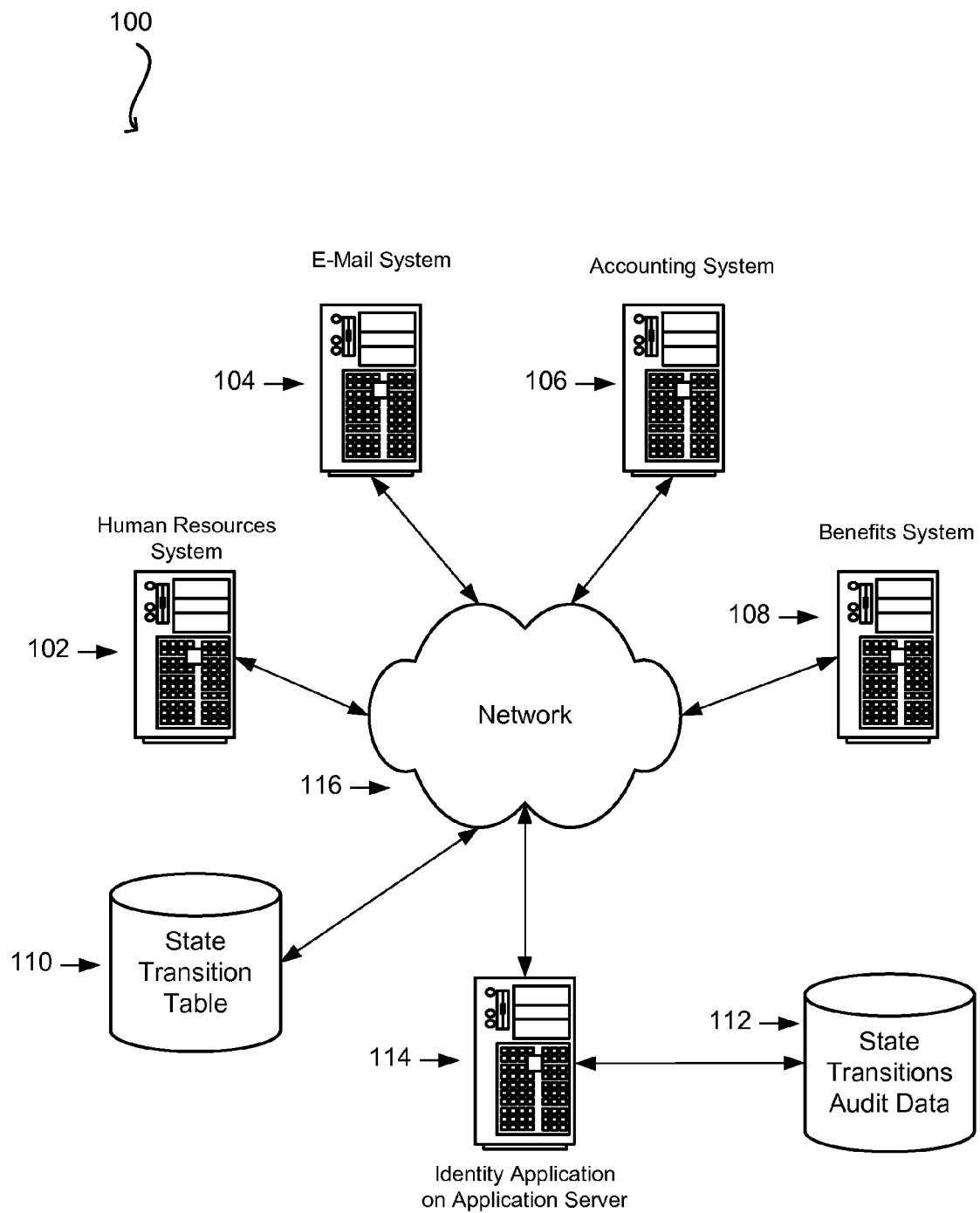
FIG. 1 depicts an exemplary environment for implementing various embodiments.

FIG. 1 depicts an exemplary environment in which embodiments of the present disclosure may be implemented. In one embodiment, system 100 may include many different applications running on many different server computers. It should be recognized that alternate embodiments may include any number of applications running on any number of server computers. In one embodiment, all applications may run on a single server. For simplicity, in this exemplary embodiment, each application may run on a dedicated server. Thus, reference to the application or the server on which it runs may be interchangeable. Human resources system 102 may include a server running a human resources application 102. A human resource application 102 may include software for performing functions such as adding a new employee to an organization, removing an employee from an organization, or modifying information about an existing employee. Human resources application 102 may manage data about an employee, such as the employee's current address, social security number, or any other information as would be necessary for managing an employee from a human resources perspective.

System 100 may also include an E-mail system 104. E-mail system 104 may be responsible for maintaining e-mail services for all employees of the organization. Services provided by e-mail system 104 may include establishing an e-mail address for each employee such that the employee may send and receive e-mail. E-mail system 104 may also allocate data storage space for the employee to store incoming e-mail. E-mail server 104 may provide e-mail services that are generally known.

System 100 may also include accounting systems 106. Accounting system 106 may manage accounts payable, accounts receivable, or any other accounting process that may be required by the organization. Accounting systems are generally known. System 100 may further include benefits system 108. Again, benefits system 108 may include managing benefits that an employee is entitled to. For example, benefits system 108 may manage an employee's retirement accounts and health insurance plans.

System 100 may further include a database that stores a state transition table 110. State transition table may be used to store actions to be performed, hold states to be observed, and follow up actions to be performed, by a host application that has implemented an asynchronous state engine with plug-ins. In some embdodiments, state transition table 110 is dynamically generated. Operation of the state transition table 110 will be described in further detail below. System 100 may also include a database that stores state transition audit data 112. As will be described further below, a host application implementing an asynchronous state engine may transition an object between many different states. The causes of these state transitions may be determined by the host application, as well as external applications. State transition audit data 112 may allow an audit trail of every action or response that is involved in a state transition to be logged, such that if it is necessary in the future to determine why a particular state transition was allowed, the exact sequence of events may be recreated. Furthermore, the audit data 112 may also include all follow up actions, and hold states. The audit data 112 may be used to determine the series of events that allowed any changes in system 100 to occur.

Although state transition table 110 and state transition audit data 112 have been depicted as separate entities, it should be clear that this is not intended to be limiting. In some embodiments, the data may be stored using a single database, such as a relational database. Any suitable means for maintaining persistent storage of data has been contemplated.

System 100 may further include an identity application running on an application server 114. Identity application 114 may provide services such as coordinating between the various applications 102, 104, 106, and 108. For purposes of this exemplary embodiment, identity application 114 will implement an asynchronous state engine. It should be realized that this is for purposes of explanation only. Any or all of the mentioned applications may also implement an asynchronous state engine.

All of the entities as described above may be in communication with each other over a network 116. Such networks may include public and private wired and wireless networks, intranets, or the Internet. The specific topology of the network 116 is relevant only to the extent that network 116 allows all of the described entities to communicate with each other.

Exemplary Business Process

In order to better understand the operation of an asynchronous state engine, it may be desirable to describe a typical business process at a high level. One exemplary business process that may occur is the addition of a new employee to the organization. The process may begin with a new employee being created in the human resources system 102. Information may be gathered by a human resources employee and entered into the human resources system, 102. After this information has been entered, human resources system 102 may send a message to identity application 114 over network 116 indicting that a new employee has been created. In alternate embodiments, identity application 114 may periodically poll human resource system 102 to determine if any new employees have been created.

Identity application 114 may be responsible for several tasks. For example, identity application 114 may be responsible for provisioning computer resources for the new employee. Such resources may include an e-mail account as provided by E-mail system 104. Additional resources may also include requesting access to various other systems, such as accounting system 106. Furthermore, identity application 114 may be responsible for requesting a user account on benefits system 108. Although several examples of systems have been presented, the list is not intended to be exhaustive. In fact, embodiments of the present disclosure contemplate the addition of additional systems and are directed toward allowing additional systems with minimal impact to the identity application itself.

In addition to requesting access to various systems as described above, Identity application 114 may also be responsible for setting a level of access for some or all of the systems, based on the employee's role within the organization. For example, if an employee is in the accounts payable department, he may need a level of access to the accounting system that allows him to pay an invoice. Similarly, an employee in accounts receivable may require a level of access to the accounting system that allows him to raise an invoice. However, there may be policies in the organization such that any employee who has the authority to raise an invoice may not also have the authority to pay an invoice, thus preventing a rogue employee from raising and paying his own invoices.

Once the access level of an employee has been set, identity application 114 may also need to update external applications. For example, an e-mail account may have been requested earlier in the process. Once the e-mail account is received, other applications, such as benefits application 108 may need to be notified of the assigned e-mail address.

Figure 2:
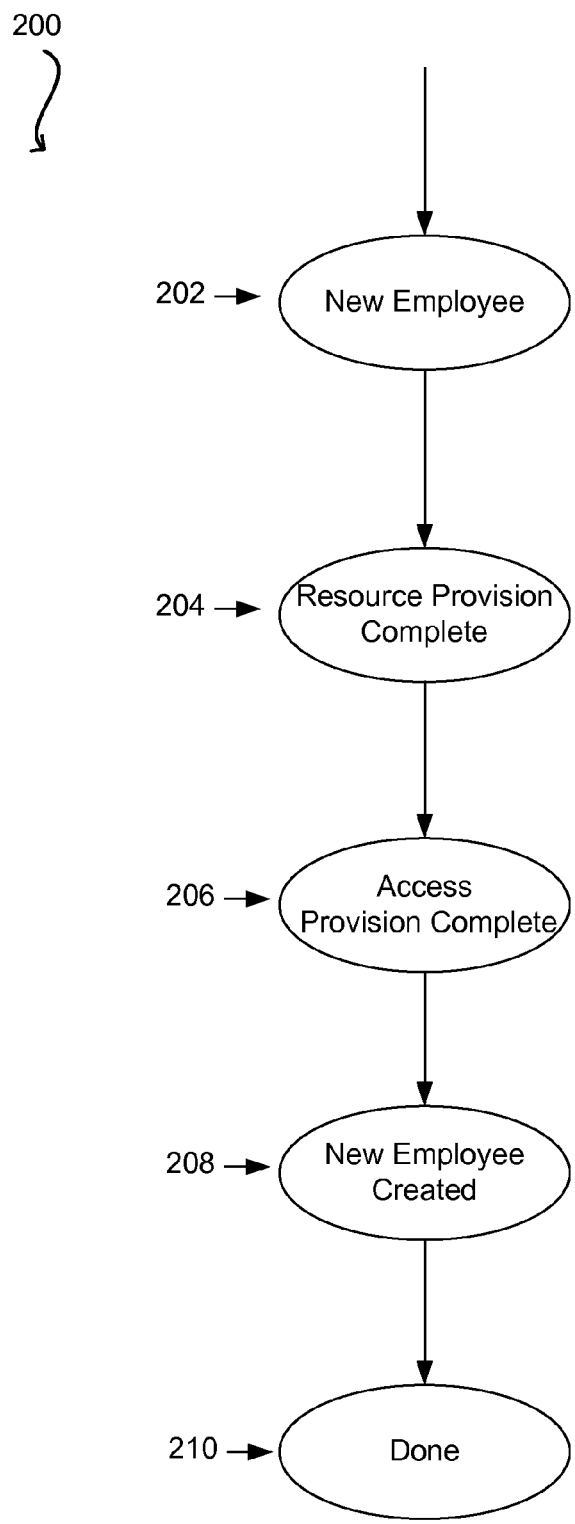
FIG. 2 depicts state changes of an exemplary application.

FIG. 2 depicts one possible set of state changes 200 of an exemplary identity application. Upon receiving notification from human resources system 102, identity application 114 may create an object representative of the new employee. The object may be set to have an initial state of "new employee" 202. In order to proceed to the next state, "Resource Provision Complete" 204, identity application 114 may request an e-mail account from E-mail system 104, an account on accounting system 106, and an account on Benefits system 108. For some of these accounts, identity application 114 needs to wait until a response is received from the respective external applications. Once all required responses are received, the employee object may be moved to the "resource provision complete" 204 state.

From the "resource provision complete" 204 state, the identity application may then set an access level to accounting system 106 and wait for a response before moving the employee object to the "access provision complete" 206 state. Once the access levels have been set, the employee object may then be moved to the "new employee created" 208 state. Finally, the new employee object may be moved to the "done" 210 state. As part of the transition to the "done" state, identity application 114 may need to notify benefits system 108 of the e-mail address that was assigned in the "resource provision complete" 204 state.

All of the activities described above are communications with external systems and may have nothing to do with the core functionality that is provided by the identity application itself. As should be clear, the addition or removal of external systems that may require interfacing with the various state changes within the identity application 114 may become very complex, and require changes to the identity application itself, even though the functionality of the identity application is remaining unchanged. As far as the identity application 114 is concerned, the employee object needs to move from the "new employee" 202 state to the "resource provision complete" 204 state to the "access provision complete" 206 state to the "new employee created" state, and finally to the "done" state. All of the external communications simply add complexity to the maintainability of the identity application 114.

Asynchronous State Engine with Plug-ins

In order to alleviate problems including at least some of those described above, a host application may implement an asynchronous state engine with plug-ins. Unlike traditional state engines, an asynchronous state engine introduces a concept that may be thought of as a "hold" state. A traditional application using a state engine typically moves a business object from one state to the next, as conditions are satisfied. For example, an expense object is moved from the "submitted" state to the "approved" state when an approval is received. An asynchronous state engine may utilize the "hold" state to indicate that a business object may currently reside between states. In the "hold" state, the host application may have completed any tasks assigned to the host application, but may be waiting for inputs from external applications.

Plug-ins may allow external applications to insert actions to be performed, or responses to wait for, into the asynchronous state engine. This may be accomplished through the use of a state transition table, as will be described in further detail below with respect to FIG. 3. Generally, an asynchronous state engine may be a state engine whose operation when moving between states is defined by an external state transitions table. The state transitions table may specify actions to be performed prior to moving from one state to the next, hold conditions that specify when transition from one state to the next should be suspended pending the satisfaction of some condition, and follow up actions that specify actions to take upon arrival at a given state. Because the state transitions table is external to the host application, external applications may plug-in desired actions, holds, and follow ups, without having to alter the host application itself.

Figure 3:
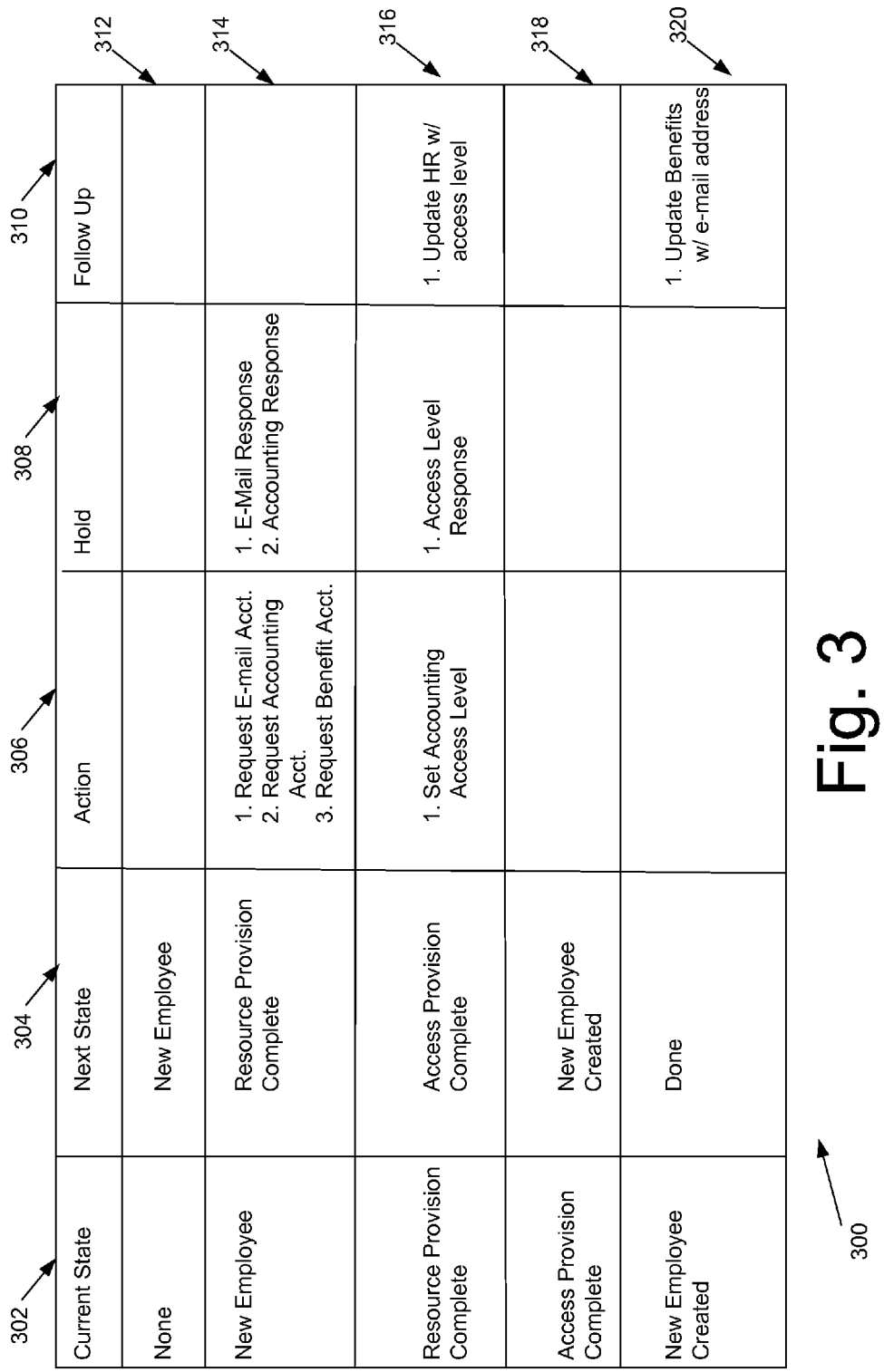
FIG. 3 depicts an exemplary state transition table.

FIG. 3 depicts an exemplary State Transition Table 300 that may correspond with the exemplary business process as described above. State transition table 300 may be stored in any number of ways that are accessible to a host application implementing an asynchronous state engine. For example, state transition table 300 may be stored as a table within a database that is accessible to the host application. In an alternate embodiment, state transition table 300 may be stored as a file accessible to the host application. In yet another embodiment, state transition table 300 is not statically stored, but rather is dynamically generated whenever access by the asynchronous state engine is required. Any other storage or generation mechanisms that would allow a host application to access the state transition table 300 would also be suitable.

For ease of description, state transition table 300 will be referred to as a data table which contains information about state transitions and additional actions to perform upon state transitions. However, it should be understood that state transitions table 300 is not necessarily a static data table. In some embodiments, the host application or external applications may not actually directly modify the state transition table 300, but rather the desired actions, holds, and follow ups are stored as entries in a database or a registry. The asynchronous state engine may dynamically generate the state transitions table 300 by retrieving the relevant entries from the database or registry. For example, if a state transition from one state to another is to occur, the asynchronous satte engine may query the database or registry to determine all systems that have requested actions or follow up actions be performed for the given state change.

The dynamic generation of the state transition table 300 advantageously allows for the host application, as well as external applications, to modify the behavior of the asynchronous state engine, without having an impact on other applications. Additionally, the dynamic nature of creation of the state transition table 300 allows for different versions of the state transition table 300 to be created based on criteria such as the particular version of the asynchronous state engine or the external applications.

State transition table 300 may also be accessible by external applications, such that the external applications needs may be reflected. Allowing access to the state transition table by external applications makes the process of adding, modifying, or removing external applications straightforward, as only the state transition table 300, not the host application itself, must be modified. Further explanation of adding an external application will be presented with respect to FIG. 5.

In one embodiment, state transition table 300 may be a described as a table. FIG. 3 is an example of one possible embodiment of a state transition table 300. State transition table may include a column indicating the current state 302 of the asynchronous state engine, the next state 304, the actions 306 to be performed, hold conditions 306, and follow up actions 310 to be performed upon entry of the state. As explained above, in some embodiments, state transition table 300 will be generated dynamically as needed by the asynchronous state engine. For each state transition that the asynchronous state engine will undergo, the state transition table 300 may be accessed to determine the actions to be performed prior to changing states. After performing those actions, the state transition table 300 be further be consulted to determine if the state transition should be placed in a hold condition, pending the results of some external action. Finally, after the result of the external action, if any, the state transition may complete and the business object may be placed in the new state. Once this occurs, the state transition table may be referenced to determine if any additional activities need to take place.

Further understanding of the state transition table 300 may be obtained by the following example, which generally corresponds to the new employee example as presented above. As discussed earlier, the process may begin with a new employee being entered into a human resources 102 system. The human resources 102 system may then send an indication to the identity application 114, which has implemented an asynchronous state engine with plug-ins. The indication may be in the form of a message sent from human resources 102 system to identity application 114 informing identity application 114 that a new employee has been entered and the functions of the identity application should be invoked for the new employee. In alternate embodiments, the identity application 114 may periodically poll human resources 102 system to determine if a new employee has been added.

The indication may cause identity application 114 to create a new business object. At this point, identity application 114 may perform any tasks that are part of the core functionality for the identity application. After these tasks are completed, the identity application may wish to move the business object from the "none" state to the "new employee" state. The asynchronous state engine operating as part of the identity application 114 may refer to the state transition table 300. As can be seen in row 312, when transitioning from the "none" to the "new employee" state, no actions 306, holds 308, or follow ups 310, are required. As such, the asynchronous state engine may move the business object to the "new employee" state.

Once in the "new employee" state, the identity application 114 may perform the tasks appropriate for that state. At this point, the identity application 114 may wish to move the business object to the "resource provision complete" state. Referring to row 314 of the state transition table 300, the identity application may be instructed to perform the actions indicated in the action 306 column of the table. In this example, the identity application 114 is instructed to request an e-mail account 104, request an accounting account 106, and request a benefits account 108. In some embodiments, the requests to external systems themselves may cause the external system to perform various actions, and follow up actions. For example, requesting an e-mail account may cause the e-mail system to initiate its own processes using an asynchronous state engine in order to provision an e-mail account.

Additionally, the actions may themselves contain conditional logic to further determine if the action is performed. For example, moving from the new employee state to resource provision complete state performs the action of requesting an e-mail account. The software that handles the request for establishing an e-mail account may contain conditional logic that determines if this employee requires an e-mail account, as organization policies may indicate that not all employees are given an e-mail account. The use of conditional logic in the requested actions removes the need for the host application to be aware of the processing of the external systems. The host application simply requests an action be performed. It is left to the software that handles the action request to determine what, if anything, needs to be done. As the action handlers are specified by the systems that perform the action in the state transition table, the system responsible for performing the action is able to control what is actually done.

Once these actions are complete, the asynchronous state engine of the identity application 114 may examine the hold 308 column to determine if the identity application 114 is free to move to the next state of "resource provision complete" or if it must wait in a hold condition for a response from some other systems. In the present example, the identity application 114 must wait for a response from the e-mail system 104 and the accounting system 106 prior to entering the "resource provision complete" state. It should be noted that no response is required from the benefits system 108 according to the present example. Once the respective responses from the e-mail system 104 and the accounting system 106 the identity application may move to the "resource provision complete" state. Upon entering the "resource provision complete" state, the asynchronous state engine may examine the follow up 310 column of the state transition table 300 to determine if any further actions are required. In the present example, no further actions are required.

In the "resource provision complete" state, the identity application 114 may again perform any functions that are necessary as part of the "resource provision complete" state of the identity application 114. Upon completion of the necessary functions, the identity application 114 may wish to move the business object to the "access provision complete" state. State transition table 300, row 316, indicates that moving to the "access provision complete" state requires setting the accounting system 106 access level. A request to set the access level of the accounting system 106 may then be sent. Referring to the hold 308 column, the asynchronous state engine is instructed to remain in a hold state until a response is received from the accounting system 106. Once this response is received, the asynchronous state engine may move the business object into the "access provision complete" state. Referring to the follow up 310 column of state transition table 310, the identity application is instructed to update the human resources 102 system with the access level granted.

In the "access provision complete" state, the identity application 114 may again perform any tasks relevant to the identity application 114 for that state. Referring to row 318, no actions 306 or holds 308 are specified, so the identity application may move the business object to the "new employee created" state. Furthermore, no follow up actions are specified, so the identity application is not required to perform any tasks upon arriving at the "new employee created" state.

Finally, from the "new employee created" state, the identity application 114 may again perform an tasks relevant to the identity application. The identity application may then wish to move the business object from the "new employee created" state to the "done" state. Referring to row 320, no actions 306 or holds 308 are required for the state transition. As such, the identity application may move the business object to the "done" state. Upon arriving at the "done" state, a follow up action 310 is specified. In the present example, the follow up action is to update the benefits system with the e-mail address that was provided by the e-mail system 104.

The follow up actions themselves may cause additional actions to occur. For example, once the benefits system is updated with the e-mail address, this follow up action may trigger a ripple effect of further actions. For example, the benefits system, upon receiving the updated e-mail address may automatically send the new employee an e-mail asking the new employee what benefits he wishes to enroll for. Follow up actions can also contain conditional logic, just like actions, to determine if the follow up action is actually executed. For example, updating the benefits system with an e-mail address may trigger an e-mail to be sent to the new employee asking if she wants to enroll in a retirement plan. However, prior to sending such an e-mail, the handler for the follow on action may first determine if the employee is eligible to enroll in a retirement plan. Just as with the actions, the conditional execution of follow up actions relieves the host application of knowing what exactly is occurring in the follow up action.

State transition table 300 may be implemented in any for suitable for an application implementing an asynchronous state engine to utilize the table. For example, actions and follow up actions may be specified as application programming interface calls or as Web Services Descriptor Language (WDSL) interfaces. It should be clear that an asynchronous state engine using plug-ins advantageously allows an application to interface with external applications in such a way as to not require modifications to the application itself. Because the state transitions table 300 is external to the application, modifications to the table, and consequently to the application's behavior, may be easier to integrate into a business system which requires interfaces to external systems and applications.

Figure 4:
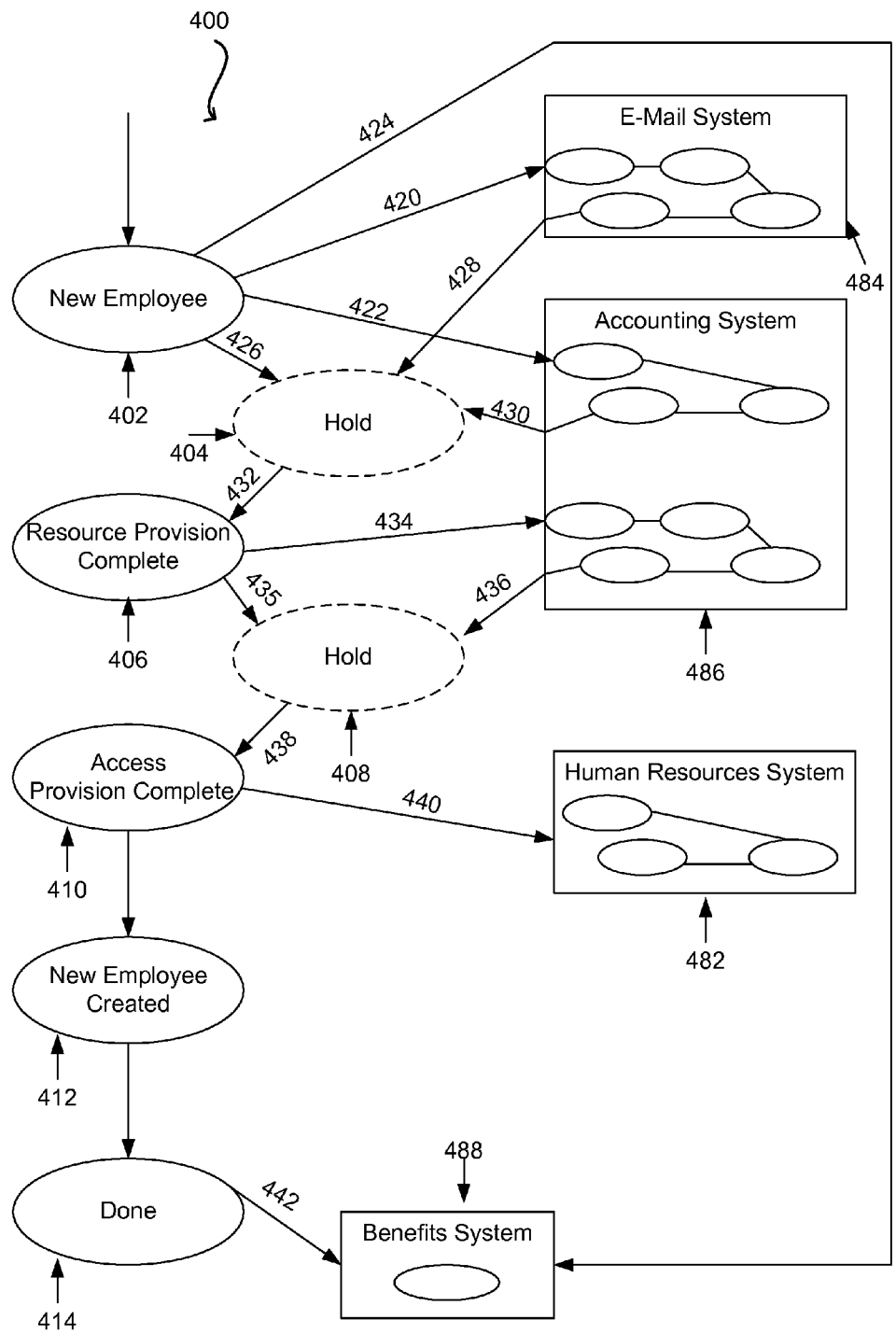
FIG. 4 depicts state changes of an exemplary application using the exemplary state transition table.

FIG. 4 depicts a graphic representation of changes within an asynchronous state engine implemented within an identity application 114 in accordance with the state transitions table 300 of FIG. 3. The figure begins with transitioning from a "does not exist state" to a "new employee" 402 state. As explained previously, and depicted in row 312 of state transition table 300, changing states from does not exist to "new employee" 402 does not require any actions, holds, or follow ups.

From the "new employee" 402 state, the identity application 114 may wish to move the business object to the "resource provision complete" state. Reviewing row 314 of state transition table 300, in order to make this transition, identity application 114 should request an e-mail account 420 from e-mail system 484, request a accounting system account 422 from accounting system 486, and request a benefit account 424 from benefits system 488. It should be noted that although this example is presented with an identity application 114 implementing an asynchronous state engine with plug-ins, any of the other systems 482, 484, 486, 488 may also implement an asynchronous state engine. For example, requesting an e-mail account from e-mail system 484 may instruct the e-mail application 484 to interact with its own state transition table.

Upon completion of the external requests 420, 422, and 424, row 314 indicates that the asynchronous state engine should enter 426 a "hold" 404 state, pending receipt of responses from e-mail system 484 and accounting system 486. Once responses 428 and 430 are received from e-mail system 484 and accounting system 486 respectively, identity application 114 may move 432 to a "resource provision complete" 406 state. As depicted in row 314, no follow up actions are required. Identity application may then complete its own assigned tasks in the "resource provision complete" state, and wish to move the business object to the "access provision complete" state. Again referring to state transition table 300, row 316, such a transition requires setting an access level within the accounting system. Identity application 114 may send such a request 434 to accounting system 486. Row 316 further indicates that identity application 114 should proceed 435 to a "hold" 408 state until a response is received from accounting system 486.

Once a response 436 is received from accounting system 486, identity application 114 may then move 438 from a "hold" 408 state to an "access provision complete" 410 state. According to row 316, upon arrival at the "access provision complete" 410 state, identity application should execute the follow up action of updating 440 the human resources system 482. The identity application may then complete tasks assigned for the "access provision complete" 410 state, and wish to move the business object to the "new employee created" 412 state. As shown in row 318, no actions, holds, or follow ups are specified, so identity application 114 may move the business object to the "new employee created" state. Again, required tasks of the identity application may be performed, and the business object moved to the "done" 414 state. Row 320 of the state transition table 300 indicates that no actions or holds are required, so the transition to "done" 414 state may complete. Upon arrival at the "done" state, a follow up action of updating 442 benefits system 488 is specified. At this point, processing of the business object by the identity application is complete.

FIG. 5 depicts an exemplary state transition table 500 after the addition of a new external application. As has been mentioned above, an asynchronous state engine with plug-ins advantageously allows for new external applications that require access to state changes within a host application to be easily integrated without requiring any changes to the host application. The state transition table 500 is almost identical to the state transition table 300, with the exception of new entries for actions and holds 502 as depicted in row 518.

As an example of adding a new external application that needs to interface with an existing host application, consider the case where an organization has installed a new building security system, such as the type that controls access to the building through the use of keycards. The building access application may maintain a database which contains the identities of employees who should be granted access to the building. Upon completion of employee provisioning by identity application 114, new building access system may need to be notified of the new employee. Furthermore, creation of the new employee may not be considered complete until building access system has responded, indicating the new employee was successfully added.

The use of a state transition table 500 makes the addition of a new external application. As depicted 502, a new external application simply inserts actions that are required for the host application to move from one state to the next. In this example, upon moving from the "access provision complete" state to the "new employee created" state, the building access system may simply insert an action for identity application 114 to perform. In this case, as depicted 502, building access system requires a request for building access to made prior to changing states. Further more, the state change should not complete, and thus identity application 114 should remain in a "hold" state, until a response is received from the building access system.

Figure 6:
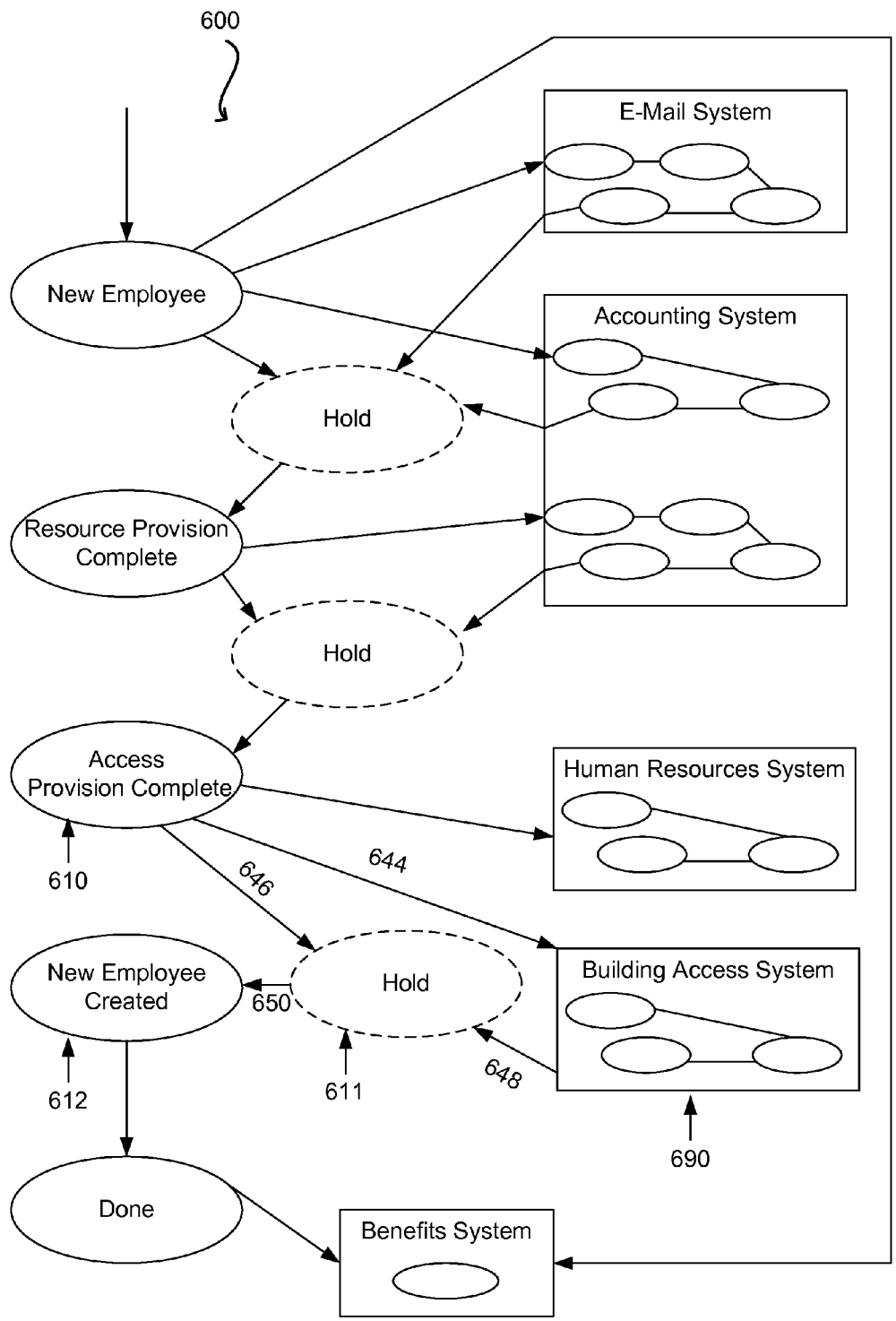
FIG. 6 depicts state changes of an exemplary application using the exemplary state transition table after the addition of a new external application.

FIG. 6 depicts a graphic representation of changes within an asynchronous state engine implemented within an identity application 114 in accordance with the state transitions table 500 of FIG. 5. FIG. 6 is generally the same as FIG. 4 except during the state transition from the "access provision complete" 610 state to the "new employee created" state. As depicted in state transition table 500, a new external building access system application has inserted actions to perform prior to the identity application 114 transitioning between states 610 and 612. Row 518 indicates that a request 644 should be sent to the building access system 690. Furthermore, row 518 indicates that the identity application 114 should remain in a "hold" 611 state until a response 648 is received from building access system 690. Upon receipt of the response 648, the transition 650 to the "new employee created" 612 state may be completed.

As should be clear, the addition of a new application requiring integration into an existing host application is simplified by use of an asynchronous state engine with plug-ins. A new application need only plug-in actions, holds, and follow up actions into a state transitions table that is used by the asynchronous state engine running within a host application. No changes to the host application itself are required. As an additional advantage, an asynchronous state engine may also log all state transition activities to an audit data database. As such, the reasons for all state transitions may be captured and reviewed if it becomes necessary to determine why a particular event happened.

Operating Environment

Figure 7:
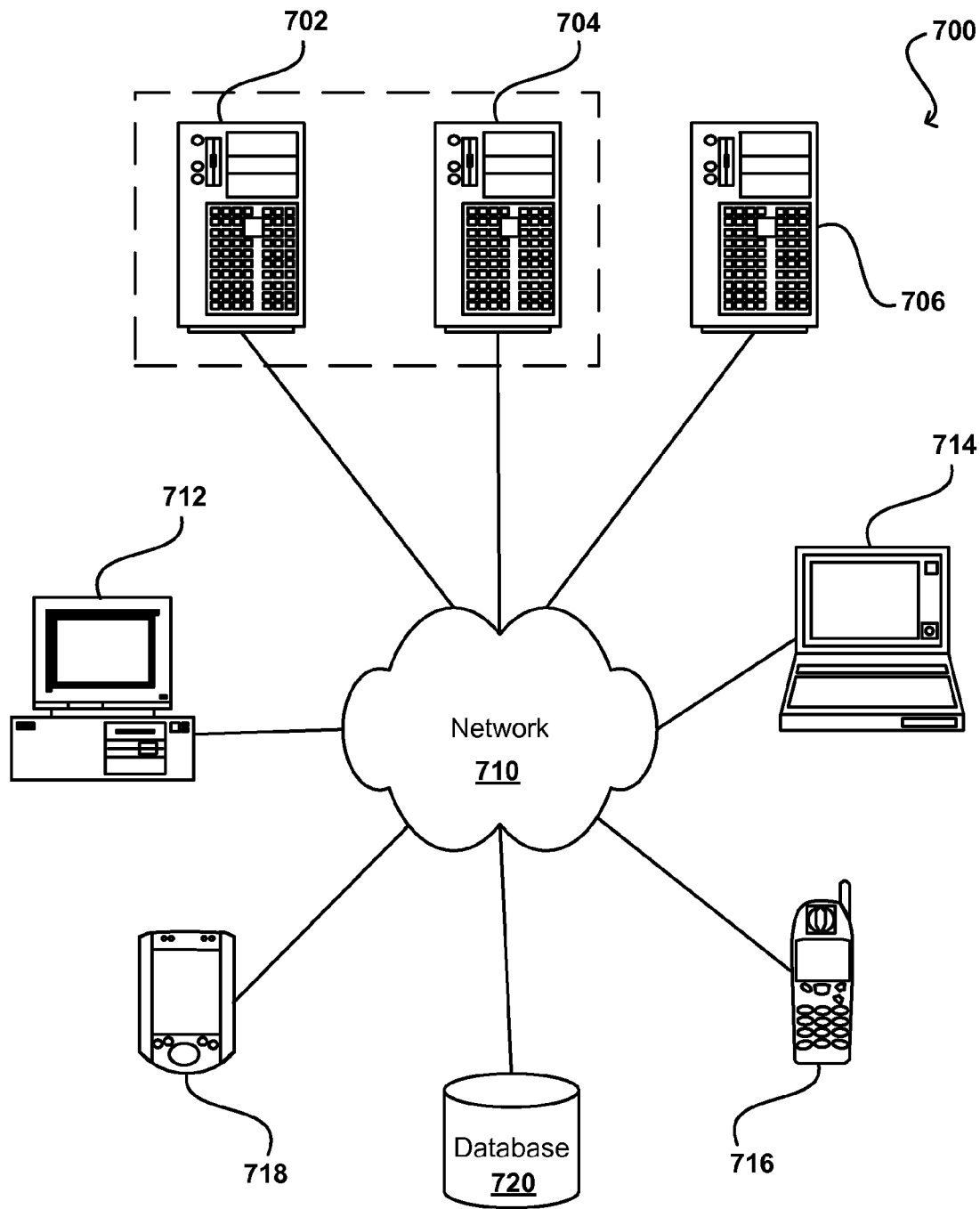
FIG. 7 illustrates components of a computer network that may be used in accordance with one embodiment.

FIG. 7 is a block diagram illustrating components of an exemplary operating environment in which various embodiments may be implemented. The system 700 can include one or more user computers, computing devices, or processing devices 712, 714, 716, 718, which can be used to operate a client, such as a dedicated application, web browser, etc. The user computers 712, 714, 716, 718 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 712, 714, 716, 718 may also have any of a variety of applications, including one or more development systems, database client and/or server applications, and Web browser applications. Alternatively, the user computers 712, 714, 716, 718 may be any other electronic device, such as a thin-client computer, Internet-enabled gaming system, and/or personal messaging device, capable of communicating via a network (e.g., the network 710 described below) and/or displaying and navigating Web pages or other types of electronic documents. Although the exemplary system 700 is shown with four user computers, any number of user computers may be supported.

In most embodiments, the system 700 includes some type of network 710. The network may can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 702, 704, 706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 706) may be dedicated to running applications, such as a business application, a Web server, application server, etc. Such servers may be used to process requests from user computers 712, 714, 716, 718. The applications can also include any number of applications for controlling access to resources of the servers 702, 704, 706.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 712, 714, 716, 718. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 712, 714, 716, 718.

The system 700 may also include one or more databases 720. The database(s) 720 may reside in a variety of locations. By way of example, a database 720 may reside on a storage medium local to (and/or resident in) one or more of the computers 702, 704, 706, 712, 714, 716, 718. Alternatively, it may be remote from any or all of the computers 702, 704, 706, 712, 714, 716, 718, and/or in communication (e.g., via the network 710) with one or more of these. In a particular set of embodiments, the database 720 may reside in a storage-area network ("SAN") familiar to those skilled in the art. Similarly, any necessary files for performing the functions attributed to the computers 702, 704, 706, 712, 714, 716, 718 may be stored locally on the respective computer and/or remotely, as appropriate. In one set of embodiments, the database 720 may be a relational database, such as Oracle 10g, that is adapted to store, update, and retrieve data in response to SQL-formatted commands.

Figure 8:
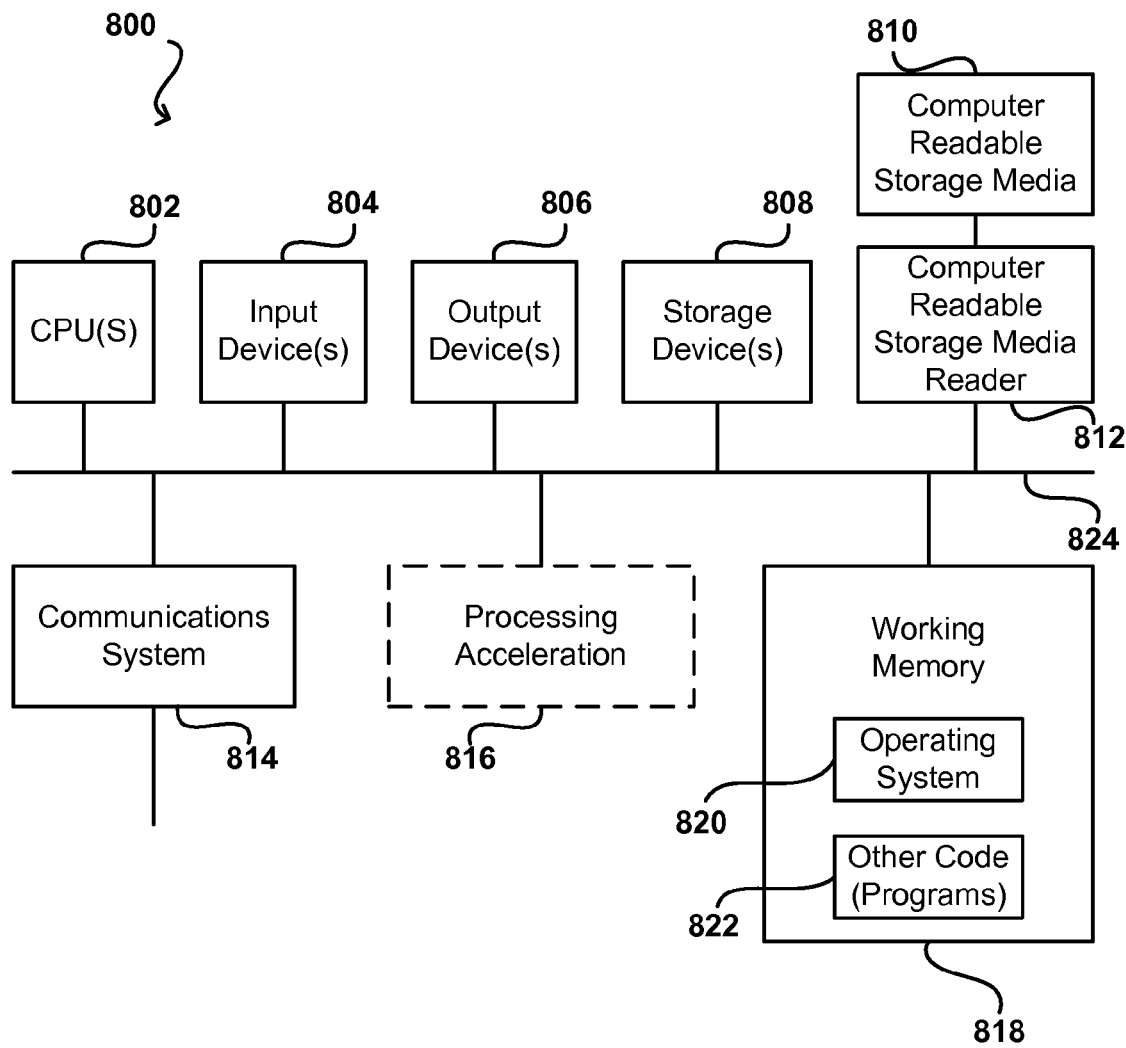
FIG. 8 illustrates components of a computerized device that may be used in accordance with one embodiment.

FIG. 8 illustrates an exemplary computer system 800, in which various embodiments may be implemented. The system 800 may be used to implement any of the computer systems described above. The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 812, a communications system 814 (e.g., a modem, a network card (wireless or wired), an infra-red communication device, etc.), and working memory 818, which may include RAM and ROM devices as described above. In some embodiments, the computer system 800 may also include a processing acceleration unit 816, which can include a digital signal processor DSP, a special-purpose processor, and/or the like.

The computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing, storing, transmitting, and retrieving computer-readable information. The communications system 814 may permit data to be exchanged with the network and/or any other computer described above with respect to the system 800.

The computer system 800 may also comprise software elements, shown as being currently located within a working memory 818, including an operating system 820 and/or other code 822, such as an application program (which may be a client application, Web browser, mid-tier application, RDBMS, etc.). It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer readable medium for a computer system, the non-transitory computer readable medium having stored thereon a series of instructions executable by a processor for implementing a computer application with an asynchronous state engine, the series of instructions comprising:
   instructions that cause the processor to create an object, the object representative of a transaction processed by the asynchronous state engine and having a state;
   instructions that cause the processor to perform a state transition of the object from an initial state to a next state, the state transition being specified in a state transition table, the state transition table including tasks to be performed by the asynchronous state engine when transitioning to the next state and specifying at least one hold condition that is to be satisfied prior to completing the state transition;
   instructions that cause the processor to perform the tasks specified in the state transition table;
   instructions that cause the processor to receive, from an external application, the at least one hold condition; and
   instructions that cause the processor to insert the at least one hold condition into the state transition table upon moving from the initial state to the next state.

2. The non-transitory computer readable medium of claim 1 wherein the state transition table specifies at least one action to perform prior to initiating the state transition.

3. The non-transitory computer readable medium of claim 2 wherein the at least one action to perform prior to initiating the state change includes sending a request to an external computer application.

4. The non-transitory computer readable medium of claim 2, the series of instructions further comprising instructions that cause the processor to, prior to moving from the initial state to the next state, insert the at least one action to be performed into the state transition table.

5. The non-transitory computer readable medium of claim 2, the series of instructions further comprising instructions that cause the processor to perform the at least one action.

6. The non-transitory computer readable medium of claim 1 wherein the at least one hold condition includes receiving a response from an external computer application.

7. The non-transitory computer readable medium of claim 1 wherein the state transition table specifies at least one follow up action to perform upon arrival at the next state.

8. The non-transitory computer readable medium of claim 7 wherein the at least one follow up action includes sending a request to an external computer application.

9. The non-transitory computer readable medium of claim 1, the series of instructions further comprising instructions that cause the processor to log state transitions, requests to external computer applications, and responses from external computer applications to a state transitions audit data database.

10. The non-transitory computer readable medium of claim 1 wherein the state transition table is configured to be modified by external applications.

11. The non-transitory computer readable medium of claim 1 wherein the state transition table is stored in a state transition table database.

12. A computer implemented method of implementing a computer application with an asynchronous state engine comprising:
   creating an object with a host computer system running the computer application, the object representative of a transaction processed by the asynchronous state engine and having a state;
   transitioning, by the host computer system, the state of the object from an initial state to a next state, the state transition being specified in a state transition table, the state transition table including tasks to be performed by the asynchronous state engine when transitioning to the next state and specifying at least one hold condition that is to be satisfied prior to completing the state transition;
   performing, by the host computer system, the tasks specified in the state transition table;
   receiving, from an external application, the at least one hold condition; and
   inserting the at least one hold condition into the state transition table upon moving from the initial state to the next state.

13. The method of claim 12 wherein the state transition table specifies at least one action to perform prior to initiating the state transition and at least one follow up action to perform upon arrival at the next state.

14. The method of claim 13 wherein the at least one action to perform includes sending a request to an external computer application, the at least one hold condition includes receiving a response from the external computer application, and the at least one follow up action includes sending a request to the external computer application.

15. The method of claim 12 further comprising logging state transitions, requests to external computer applications, and responses from external computer applications to a state transitions audit data database with the host computer system running the computer application.

16. A system for implementing a computer application with an asynchronous state engine, the system comprising:
   a processor; and
   a memory configured to store a set of instructions which when executed by the processor configure the processor to:
      create an object, the object representative of a transaction processed by the asynchronous state engine and having a state;
      transition the state of the object from an initial state to a next state, the state transition being specified in a state transition table, the state transition table including tasks to be performed by the asynchronous state engine when transitioning to the next state and specifying at least one hold condition that is to be satisfied prior to completing the state transition;
      perform the tasks specified in the state transition table;
      receive, from an external application, the at least one hold condition;
      insert the at least one hold condition into the state transition table upon moving from the initial state to the next state.

17. The system of claim 16 wherein the state transition table specifies at least action to perform prior to initiating the state transition and at least one follow up action to perform upon arrival at the next state.

18. The system of claim 17 wherein the at least one action to perform includes sending a request to an external computer application, the at least one hold condition includes receiving a response from the external computer application, and the at least one follow up action includes sending a request to the external computer application.

19. The system of claim 16 wherein the processor is further configured to log state transitions, requests to external computer applications, and responses from external computer applications to a state transitions audit data database.

* * * * *

UNITED STATES PATENT AND TRADEMARK OFFICE
CERTIFICATE OF CORRECTION

PATENT NO.         : 8,554,798 B2                                  Page 1 of 1
APPLICATION NO.    : 12/582467
DATED              : October 8, 2013
INVENTOR(S)        : Vandanapu et al.

It is certified that error appears in the above-identified patent and that said Letters Patent is hereby corrected as shown below:

In the Specification

Column 5, line 9, delete "embdodiments," and insert -- embodiments, --, therefor.

Column 7, line 58, delete "satte" and insert -- state --, therefor.

Column 10, line 38, delete "(WDSL)" and insert -- (WSDL) --, therefor.

In the Claims

Column 16, line 57, in Claim 17, delete "at least" and insert -- at least one --, therefor.

Signed and Sealed this
Eighteenth Day of February, 2014

Michelle K. Lee
*Deputy Director of the United States Patent and Trademark Office*